United States Patent
Noie (10) Patent No.: US 7,535,189 B2
(45) Date of Patent: May 19, 2009

(54) MOTOR DRIVE CIRCUIT

(75) Inventor: Joji Noie, Gunma-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 278 days.

(21) Appl. No.: 11/690,280

(22) Filed: Mar. 23, 2007

(65) Prior Publication Data

US 2007/0241701 A1 Oct. 18, 2007

(30) Foreign Application Priority Data

Mar. 24, 2006 (JP) .............................. 2006-083617

(51) Int. Cl.
*H02P 6/00* (2006.01)
(52) U.S. Cl. .............................. 318/400.29; 388/907.2; 363/56.02; 363/56.05
(58) Field of Classification Search ................. 318/798, 318/805, 808, 812, 400.29; 388/907.2; 363/55, 363/56.01, 56.02, 56.04, 56.05
See application file for complete search history.

(56) References Cited

U.S. PATENT DOCUMENTS

| | | | | |
|---|---|---|---|---|
| 5,859,519 | A * | 1/1999 | Archer | 318/801 |
| 6,094,021 | A * | 7/2000 | Noro et al. | 318/400.29 |
| 6,175,204 | B1 * | 1/2001 | Calamatas | 318/375 |
| 6,933,688 | B2 * | 8/2005 | Junnan et al. | 318/400.29 |
| 6,943,510 | B2 * | 9/2005 | Gorti | 318/275 |
| 2001/0048278 | A1 * | 12/2001 | Young et al. | 318/254 |

FOREIGN PATENT DOCUMENTS

JP 2003-348880 12/2003
JP 2005-269885 9/2005

* cited by examiner

*Primary Examiner*—Rina I Duda
(74) *Attorney, Agent, or Firm*—SoCal IP Law Group LLP; Steven C. Sereboff; John E. Gunther (57) ABSTRACT

A motor drive circuit comprises a first power line; a second power line; an H-bridge circuit that includes a first source transistor and a first sink transistor connected serially, a second source transistor and a second sink transistor connected serially, a motor coil connected at a connection point between the first source transistor and the first sink transistor, and first to fourth regenerative diodes disposed respectively on the first and second source transistors and the first and second sink transistors, the H-bridge circuit being connected between the first power line and the ground, the first source transistor and the second sink transistor being switched complementarily to the second source transistor and the first sink transistor; and a voltage constraint circuit connected between the second power line and control electrodes of the first and second source transistors, the voltage constraint circuit constraining increase in the voltage of the control electrodes of the first and second source transistors to a voltage corresponding to the voltage of the second power line, the first and second source transistors being transistors turned on/off in accordance with a voltage difference between an electrode on the first power line and the control electrode, the voltage of the second power line being a voltage that turns off the second source transistor if a current flows from the first source transistor to the second sink transistor.

8 Claims, 4 Drawing Sheets

MOTOR DRIVE CIRCUIT

CROSS-REFERENCE TO RELATED APPLICATION

This application claims the benefit of priority to Japanese Patent Application No. 2006-83617, filed Mar. 24, 2006, of which full contents are incorporated herein by reference.

BACKGROUND OF THE INVENTION

1. Field of the Invention

The present invention relates to a motor drive circuit.

2. Description of Related Art

An H-bridge circuit is generally used as a circuit for driving a motor. If a motor is driven by the H-bridge circuit, a Zener diode is used to constrain voltage increase so as not to cause breakdown of MOSFET due to the voltage increase when a kickback is generated (e.g., Japanese Patent Application Laid-Open Publication No. 2005-269885).

Figure 4:
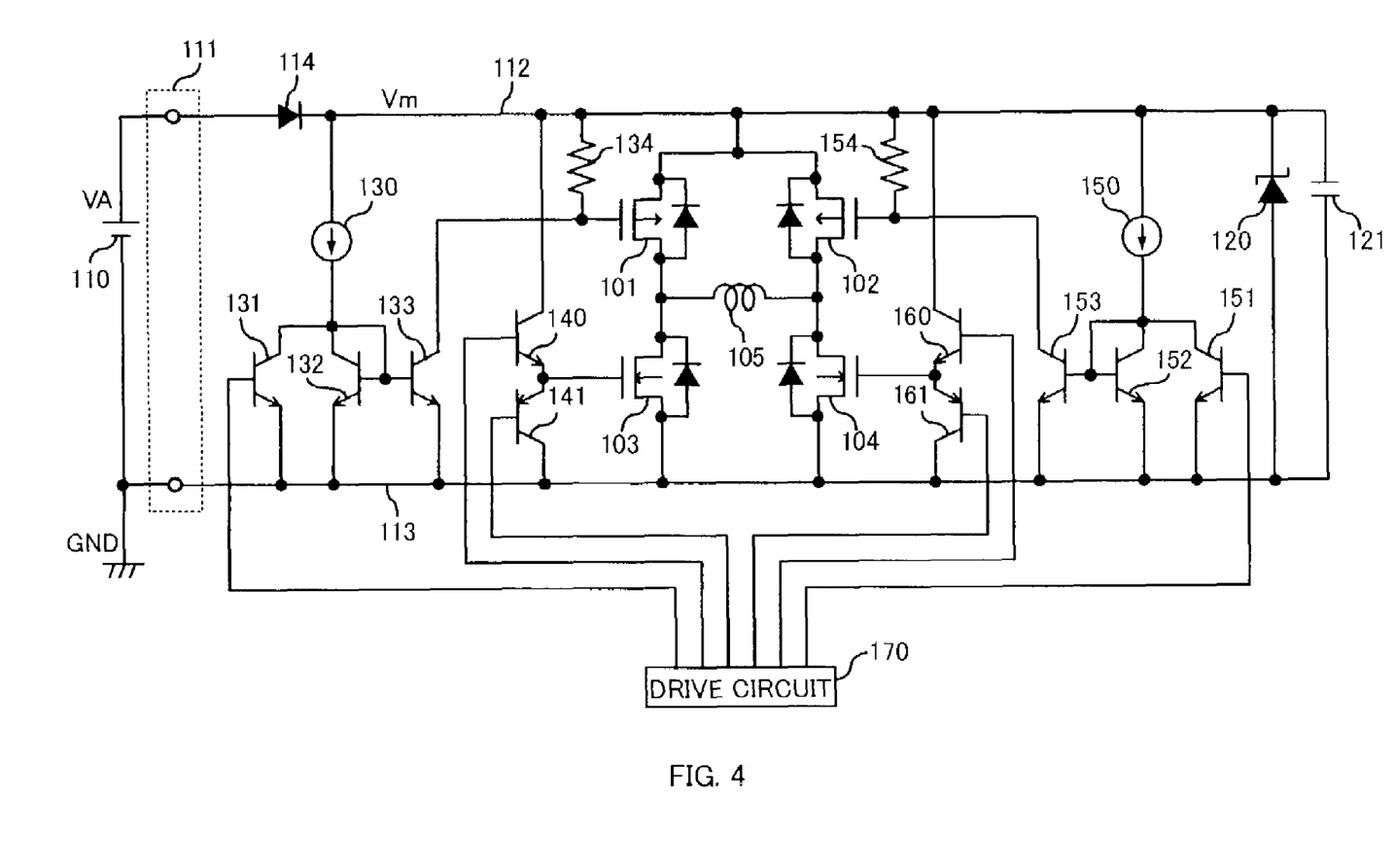
FIG. 4 is a diagram of a configuration example of a motor drive circuit that uses a Zener diode to constrain voltage increase.

FIG. 4 is a diagram of a configuration example of a motor drive circuit that uses a Zener diode to constrain voltage increase. A current source 130, NPN-transistors 131 to 133, and a resistor 134 are disposed for a circuit controlling ON/OFF of a P-channel MOSFET 101.

If the NPN-transistor 131 is turned off, a current output from the current source 130 flows into the NPN-transistor 132, and a current also flows through the NPN-transistor 133 connected in a current mirror in accordance with a mirror ratio. As a result, a current also flows through the resistor 134; a voltage obtained by reducing a voltage Vm of a power line 112 is applied to the gate of the MOSFET 101; and the P-channel MOSFET 101 is turned on.

On the other hand, if the NPN-transistor 131 is turned on, the current output from the current source 130 flows into the NPN-transistor 131, and therefore, no current flows through the resistor 134. As a result, the gate voltage of the P-channel MOSFET 101 is raised to the voltage Vm of the power line 112, and the P-channel MOSFET 101 is turned off.

An NPN-transistor 140 and a PNP-transistor 141 are disposed for a circuit controlling ON/OFF of an N-channel MOSFET 103. If the NPN-transistor 140 is turned on and the PNP-transistor 141 is turned off, the gate voltage of the N-channel MOSFET 103 is raised to the voltage Vm of the power line 112 and the N-channel MOSFET 103 is turned on.

On the other hand, if the NPN-transistor 140 is turned off and the PNP-transistor 141 is turned on, the gate voltage of the N-channel MOSFET 103 is reduced to a voltage of a ground line 113 and the N-channel MOSFET 103 is turned off.

Similarly, a current source 150, NPN-transistors 151 to 153, and a resistor 154 are disposed for a circuit controlling ON/OFF of a P-channel MOSFET 102. An NPN-transistor 160 and a PNP-transistor 161 are disposed for a circuit controlling ON/OFF of an N-channel MOSFET 104. A drive circuit 170 controlling the drive of the motor by controlling ON/OFF of the transistors is implemented.

If the P-channel MOSFET 101 and the N-channel MOSFET 104 are turned on and the P-channel MOSFET 102 and the N-channel MOSFET 103 are turned off in such a motor drive circuit, a current flows from the power line 112 toward the P-channel MOSFET 101, a motor coil 105, and the N-channel MOSFET 104, and the motor rotates in one direction. If the P-channel MOSFET 101 and the N-channel MOSFET 104 are turned off from this state at any timing, the current tries to continue flowing because of energy accumulated in the coil 105. Therefore, a kickback current is generated via a parasitic diode 103d of the N-channel MOSFET 103 and a parasitic diode 102d of the P-channel MOSFET 102.

This kickback current cannot be regenerated on the power source 110 because of a diode 114 and flows into a condenser 121. Therefore, the voltage Vm of the power line 112 is increased. Even when the diode 114 does not exist, the voltage Vm of the power line 112 is increased in such a case that the power line 112 is long. In this situation, the increase in the voltage Vm of the power line 112 is constrained by a Zener diode 120 to prevent the P-channel MOSFET 101 and 102 from being broken.

By the way, as a motor size is enlarged, the size of the Zener diode 120 must be enlarged since the increase in the voltage Vm of the power line 112 becomes larger. The size of the condenser 121 must also be enlarged to about 100 μF to 1000 μF. The enlargement of the sizes of the Zener diode 120 and condenser 121 cause cost increase.

SUMMARY OF THE INVENTION

The present invention was conceived in view of the above problem and it is therefore the object of the present invention to provide a low cost motor drive circuit that can constrain voltage increase to prevent MOSFET from being broken when a kickback is generated.

In order to achieve the above object, according to an aspect of the present invention A motor drive circuit comprises a first power line; a second power line; an H-bridge circuit that includes a first source transistor and a first sink transistor connected serially, a second source transistor and a second sink transistor connected serially, a motor coil connected at a connection point between the first source transistor and the first sink transistor, and first to fourth regenerative diodes disposed respectively on the first and second source transistors and the first and second sink transistors, the H-bridge circuit being connected between the first power line and the ground, the first source transistor and the second sink transistor being switched complementarily to the second source transistor and the first sink transistor; and a voltage constraint circuit connected between the second power line and control electrodes of the first and second source transistors, the voltage constraint circuit constraining increase in the voltage of the control electrodes of the first and second source transistors to a voltage corresponding to the voltage of the second power line, the first and second source transistors being transistors turned on/off in accordance with a voltage difference between an electrode on the first power line and the control electrode, the voltage of the second power line being a voltage that turns off the second source transistor if a current flows from the first source transistor to the second sink transistor.

Other features of the present invention will become apparent from descriptions of this specification and of accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

FIRST EMBODIMENT (1) Circuit Configuration

Figure 1:
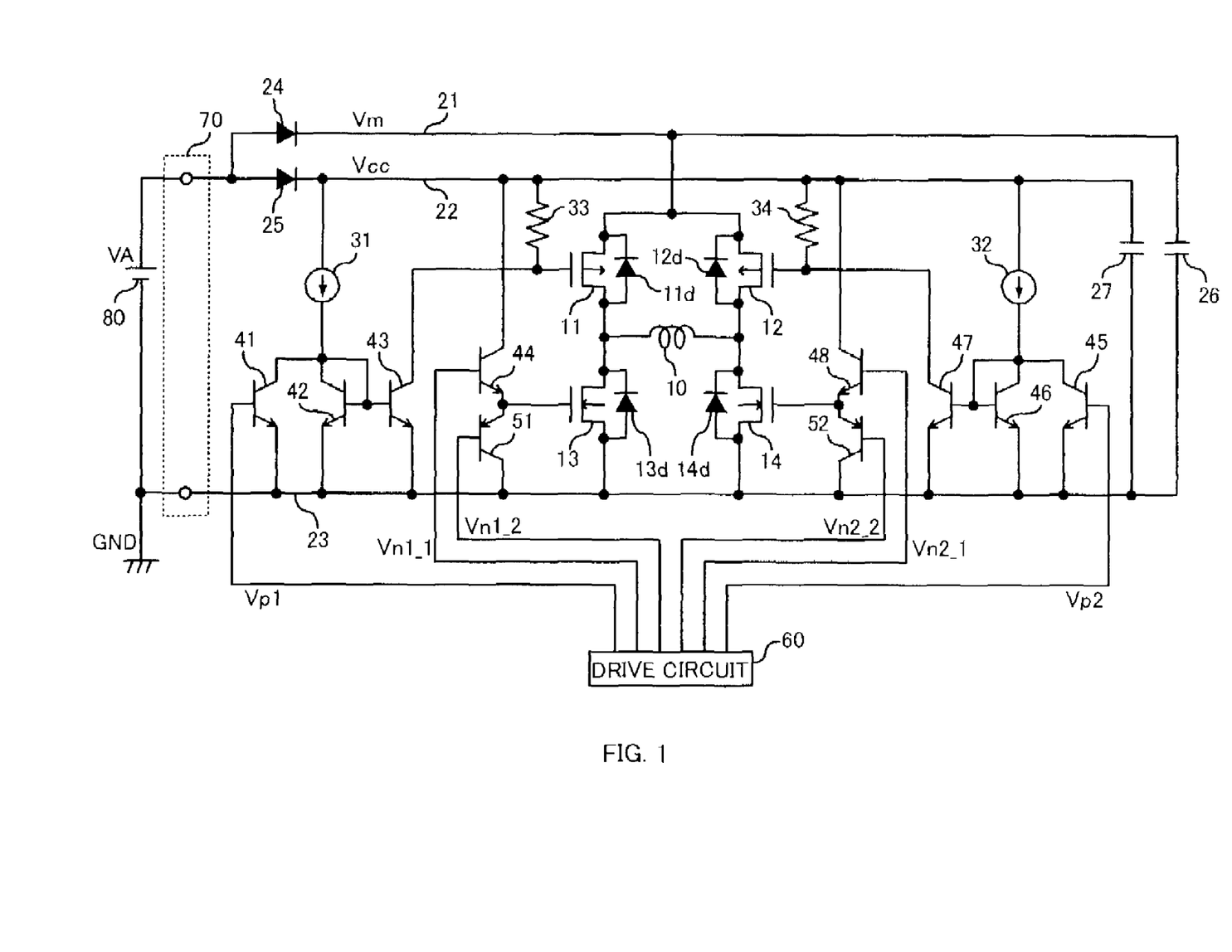
FIG. 1 is a diagram of a configuration example of a motor drive circuit that is a first embodiment of the present invention.

A configuration of a motor drive circuit of a first embodiment will be described. FIG. 1 is a diagram of a configuration example of a motor drive circuit that is the first embodiment of the present invention. The motor drive circuit is a circuit that drives a single-phase motor, for example, a fan motor and controls a current flowing through a motor coil 10. In this embodiment, the motor drive circuit includes a P-channel MOSFET 11 (first source transistor), a P-channel MOSFET 12 (second source transistor), an N-channel MOSFET 13 (first sink transistor), an N-channel MOSFET 14 (second sink transistor), a power line 21 (first power line), a power line 22 (second power line), a ground line 23, diodes 24, 25, condensers 26, 27, power sources 31, 32, NPN-transistors 41 to 48, PNP-transistors 51, 52, a drive circuit 60, and a connector 70.

The P-channel MOSFET 11, 12 and the N-channel MOSFET 13 and 14 configure an H-bridge circuit. In such an H-bridge circuit, for example, when the P-channel MOSFET 11 and the N-channel MOSFET 14 are turned on and the P-channel MOSFET 12 and the N-channel MOSFET 13 are turned off, a current flows through the motor coil 10 and a motor rotates in one direction. For example, when the P-channel MOSFET 11 and the N-channel MOSFET 14 are turned off and the P-channel MOSFET 12 and the N-channel MOSFET 13 are turned on, a current flows through the motor coil 10 in the opposite direction.

The power line 21 is disposed with the diode 24. This diode 24 prevents a current from flowing from the power line 21 toward the power source 80 and a circuit from being broken when the power source 80 is reversely connected to the connector 70, for example. Similarly, the power line 22 is disposed with the diode 25. The power line 21 is disposed with the condenser 26. The condenser 26 absorbs a current generated if a kickback occurs in the H-bridge circuit. The power line 22 is disposed with the condenser 27 for stabilizing a voltage Vcc of the power line 22. Since the condenser 27 is designed to stabilize the voltage Vcc of the power line 22, the condenser 27 does not need a large capacity and can be about 0.1 μF to 1 μF, for example.

The current source 31, the resistor 33, and the NPN-transistors 41 to 43 configure a control circuit (first control circuit) that controls ON/OFF of the P-channel MOSFET 11. If a voltage Vp1 is L-level, the NPN-transistor 41 is turned off; a current output from the current source 31 flows into the NPN-transistor 42; and a current also flows through the NPN-transistor 43 connected in a current mirror in accordance with a mirror ratio. As a result, a current also flows through the resistor 33; a voltage obtained by reducing the voltage Vcc of the power line 22 is applied to the gate of the P-channel MOSFET 11; and the P-channel MOSFET 11 is turned on. On the other hand, if the voltage Vp1 is H-level, the NPN-transistor 41 is turned on; the current output from the current source 31 flows into the NPN-transistor 41; and no current flows through the NPN-transistors 42 and 43. Therefore, no current flows through the resistor 33; the gate voltage of the P-channel MOSFET 11 is raised to the voltage Vcc of the power line 22, and the P-channel MOSFET 11 is turned off.

Similarly, the current source 32, the resistor 34, and the NPN-transistors 45 to 47 configure a control circuit (second control circuit) that controls ON/OFF of the P-channel MOSFET 12. If a voltage Vp2 is L-level, the NPN-transistor 45 is turned off; a current output from the current source 31 flows into the NPN-transistor 46; and a current also flows through the NPN-transistor 47 connected in a current mirror in accordance with a mirror ratio. As a result, a current also flows through the resistor 34; a voltage obtained by reducing the voltage Vcc of the power line 22 is applied to the gate of the P-channel MOSFET 12; and the P-channel MOSFET 12 is turned on. On the other hand, if the voltage Vp2 is H-level, the NPN-transistor 45 is turned on; the current output from the current source 32 flows into the NPN-transistor 45; and no current flows through the NPN-transistors 46 and 47. Therefore, no current flows through the resistor 34; the gate voltage of the P-channel MOSFET 12 is raised to the voltage Vcc of the power line 22, and the P-channel MOSFET 12 is turned off.

Since the gate of the P-channel MOSFET 11 is connected to the power line 22 via the resistor 33, the gate voltage of the P-channel MOSFET 11 is constrained to the voltage Vcc of the power line 22 or less. Since the gate of the P-channel MOSFET 12 is connected to the power line 22 via the resistor 34, the gate voltage of the P-channel MOSFET 12 is constrained to the voltage Vcc of the power line 22 or less. That is, the resistor 33 (first resistor) and the resistor 34 (second resistor) correspond to a voltage control circuit of the present invention.

The NPN-transistor 44 and the PNP-transistor 51 configure a control circuit (third control circuit) that controls ON/OFF of the N-channel MOSFET 13. Voltages Vn1_1 and Vn1_2 are H-level, the NPN-transistor 44 is turned on; the PNP-transistor 51 is turned off; the gate voltage of the N-channel MOSFET 13 is raised to the voltage Vcc of the power line 22; and the N-channel MOSFET 13 is turned on. On the other hand, if the voltages Vn1_1 and Vn1_2 are L-level, the NPN-transistor 44 is turned off; the PNP-transistor 51 is turned on; the gate voltage of the N-channel MOSFET 13 is reduced to the voltage of the ground line 23; and the N-channel MOSFET 13 is turned off.

Similarly, the NPN-transistor 48 and the PNP-transistor 52 configure a control circuit (fourth control circuit) that controls ON/OFF of the N-channel MOSFET 14. Voltages Vn2_1 and Vn2_2 are H-level, the NPN-transistor 48 is turned on; the PNP-transistor 52 is turned off; the gate voltage of the N-channel MOSFET 14 is raised to the voltage Vcc of the power line 22; and the N-channel MOSFET 14 is turned on. On the other hand, if the voltages Vn2_1 and Vn2_2 are L-level, the NPN-transistor 48 is turned off; the PNP-transistor 52 is turned on; the gate voltage of the N-channel MOSFET 14 is reduced to the voltage of the ground line 23; and the N-channel MOSFET 14 is turned off.

The drive circuit 60 turns on/off the P-channel MOSFET 11, 12 and the N-channel MOSFET 13, 14 with the voltages Vp1, Vp2, Vn1_1, Vn1_2, Vn2_1, and Vn2_2 to control the drive of the motor.

(2) Description of Operation

Operation of the motor drive circuit of the first embodiment will be described. First, it is assumed that the P-channel MOSFET 11 and the N-channel MOSFET 14 are turned on and that the P-channel MOSFET 12 and the N-channel MOSFET 13 are turned off. In this case, a current flows from the power line 21 toward the P-channel MOSFET 11, the motor coil 10, and the N-channel MOSFET 14, and the motor rotates in one direction. It is assumed that the P-channel MOSFET 11 and the N-channel MOSFET 14 are turned off at any timing. In this situation, energy is accumulated in the motor coil 10, and the motor coil 10 tries to continue applying the current. Therefore, the current flows through a parasitic diode 13d (third regenerative diode) of the N-channel MOSFET 13, the motor coil 10, and a parasitic diode 12d (second regenerative diode) of the P-channel MOSFET 12. That is, a kickback is generated.

The current generated by the kickback cannot be regenerated on the power source 80 because of the diode 24 and flows into the condenser 26. Therefore, the voltage Vm of the power line 21 is increased. Even when the diode 24 does not exist, the voltage Vm of the power line 21 is increased in such a case that the power line 21 is long. If the voltage Vm of the power line 21 is increased and if a voltage between the gate and source of the P-channel MOSFET 11, 12 exceeds a threshold voltage, the P-channel MOSFET 11, 12 are automatically turned on. Therefore, the current output from the motor coil 10 flows through the P-channel MOSFET 12 and the P-channel MOSFET 11 and returns to the motor coil 10. That is, the energy accumulated in the motor coil 10 is consumed by a loop configured by the motor coil 10, the P-channel MOSFET 12, and the P-channel MOSFET 11 on the power source side of the H-bridge circuit. If the energy accumulated in the motor coil 10 is consumed and if the voltage between the gate and source of the P-channel MOSFET 11, 12 becomes lower than the threshold voltage, the P-channel MOSFET 11, 12 are automatically turned off.

If the P-channel MOSFET 12 and the N-channel MOSFET 13 are then turned on and the P-channel MOSFET 11 and the N-channel MOSFET 14 are turned off, a current flows from the power line 21 toward the P-channel MOSFET 12, the motor coil 10, and the N-channel MOSFET 13. It is assumed that the P-channel MOSFET 12 and the N-channel MOSFET 13 are turned off at any timing. In this situation, energy is accumulated in the motor coil 10, and the motor coil 10 tries to continue applying the current. Therefore, the current flows through a parasitic diode 14d (fourth regenerative diode) of the N-channel MOSFET 14, the motor coil 10, and a parasitic diode 11d (first regenerative diode) of the P-channel MOSFET 11.

In this case, the current generated by the kickback cannot be regenerated on the power source 80 because of the diode 24 and flows into the condenser 26, and the voltage Vm of the power line 21 is increased. If the voltage Vm of the power line 21 is increased and if a voltage between the gate and source of the P-channel MOSFET 11, 12 exceeds a threshold voltage, the P-channel MOSFET 11, 12 are automatically turned on. Therefore, the current output from the motor coil 10 flows through the P-channel MOSFET 11 and the P-channel MOSFET 12 and returns to the motor coil 10. That is, the energy accumulated in the motor coil 10 is consumed by a loop on the power source side of the H-bridge circuit. If the energy accumulated in the motor coil 10 is consumed and if the voltage between the gate and source of the P-channel MOSFET 11, 12 becomes lower than the threshold voltage, the P-channel MOSFET 11, 12 are automatically turned off.

Therefore, in the motor drive circuit shown in FIG. 1, the increase in the voltage Vm of the power line 21 due to the generation of the kickback is constrained to the same level as the threshold voltage of the P-channel MOSFET 11, 12. Therefore, a large size Zener diode is not necessary for constraining the increase in the voltage Vm of the power line 21. Since the current generated by the kickback goes around the loop on the power source side of the H-bridge circuit, the size of the condenser 26 can be reduced to about 1 μF to 10 μF, for example. That is, when the kickback is generated, the increase in the voltage Vm of the power line 21 can be constrained to prevent the P-channel MOSFET 11, 12 from being broken, and a low cost motor drive circuit can be realized.

Even if the P-channel MOSFET 12 and the N-channel MOSFET 13 is turned on under the control of the drive circuit 60 while the P-channel MOSFET 11, 12 are turned on due to the increase in the voltage Vm of the power line 21, the current output from the motor coil 10 returns to the motor coil 10 without flowing from the P-channel MOSFET 11 to the N-channel MOSFET 13. This is because a current cannot flow through the diode 24 in the forward direction since the voltage Vm of the power line 21 is increased due to the generation of the kickback. Similarly, even if the P-channel MOSFET 11 and the N-channel MOSFET 14 is turned on under the control of the drive circuit 60 while the P-channel MOSFET 11, 12 are turned on due to the increase in the voltage Vm of the power line 21, the current output from the motor coil 10 returns to the motor coil 10 without flowing from the P-channel MOSFET 12 to the N-channel MOSFET 14.

SECOND EMBODIMENT

Figure 2:
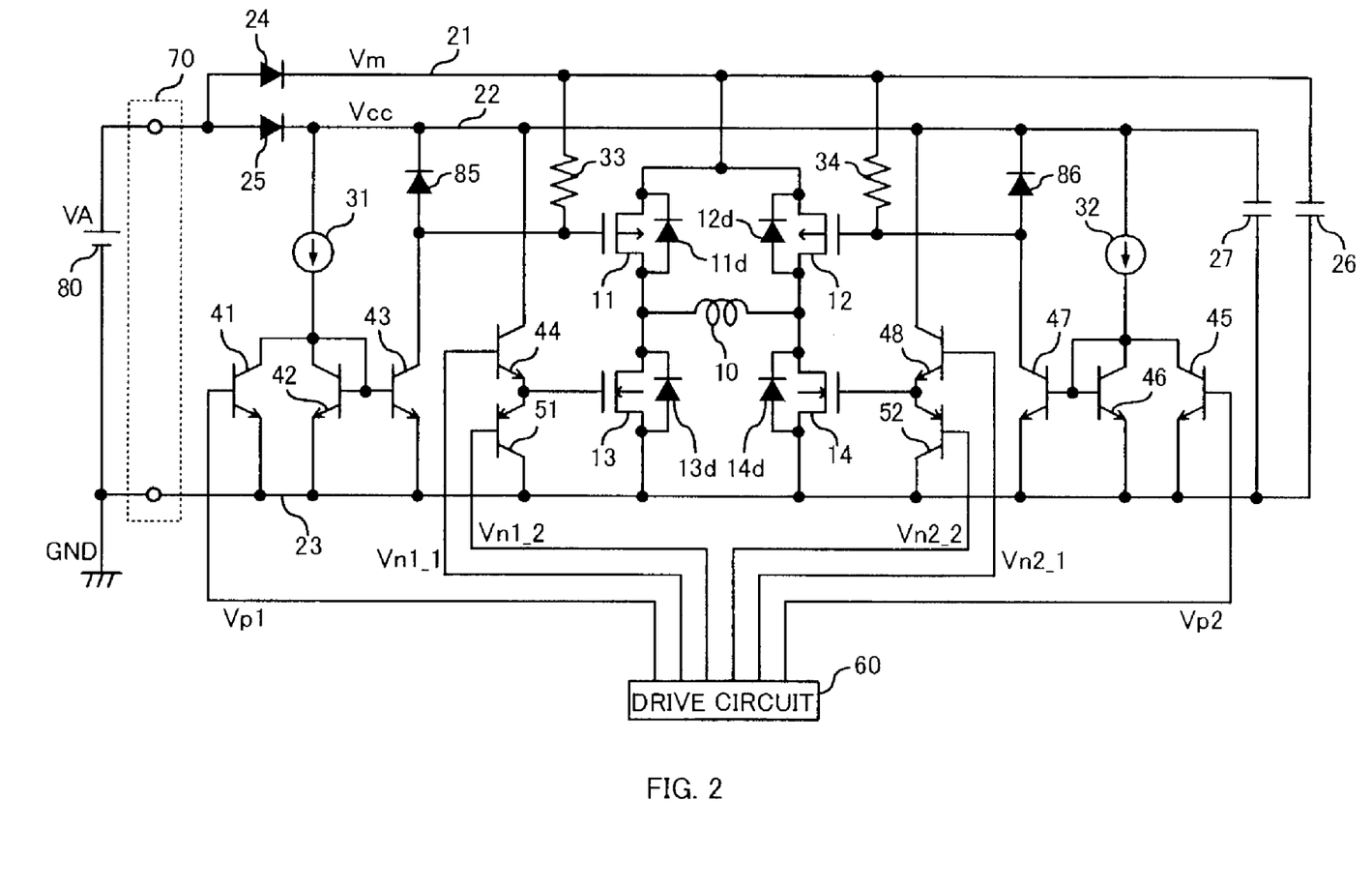
FIG. 2 is a diagram of a configuration example of a motor drive circuit that is a second embodiment of the present invention.

A configuration of a motor drive circuit of a second embodiment will be described. FIG. 2 is a diagram of a configuration example of a motor drive circuit that is the second embodiment of the present invention. The motor drive circuit shown in FIG. 2 includes a diode 85 (first diode) and a diode 86 (second diode) in addition to the configuration of the motor drive circuit shown in FIG. 1. Unlike the first embodiment, the resistor 33 is connected to the power line 21 at one end and connected to the gate of the P-channel MOSFET 11 at the other end. The resistor 34 is connected to the power line 21 at one end and connected to the gate of the P-channel MOSFET 12 at the other end.

In the motor drive circuit with this configuration, when the voltage Vm of the power line 21 is increased due to the generation of the kickback, the source voltage and gate voltage of the P-channel MOSFET 11, 12 are increased. However, since the gate of the P-channel MOSFET 11 is connected to the power line 22 through the diode 85, the gate voltage of the P-channel MOSFET 11 is constrained to a voltage Vcc+Vf, which is obtained by adding a forward voltage Vf of the diode 85 to the voltage Vcc of the power line 22. Similarly, since the gate of the P-channel MOSFET 12 is connected to the power line 22 through the diode 86, the gate voltage of the P-channel MOSFET 12 is constrained to a voltage Vcc+Vf, which is obtained by adding a forward voltage Vf of the diode 86 to the voltage Vcc of the power line 22. That is, the diodes 85, 86 correspond to a voltage constraint circuit of the present invention.

If the voltage Vm of the power line 21 is continuously increased, the voltage between the gate and source of the P-channel MOSFET 11, 12 exceeds a threshold voltage and the P-channel MOSFET 11, 12 are turned on. Therefore, when the kickback is generated, if the voltage Vm of the power line 21 is increased, the P-channel MOSFET 11, 12 are turned on, and the current generated by the kickback goes around the loop on the power source side of the H-bridge circuit as is the case with the first embodiment. As a result, the increase in the voltage Vm of the power line 21 due to the generation of the kickback is constrained to the same level as the threshold voltage of the P-channel MOSFET 11, 12.

Therefore, a large size Zener diode is not necessary for constraining the increase in the voltage Vm of the power line 21. Since the current generated by the kickback goes around the loop on the power source side of the H-bridge circuit, the size of the condenser 26 can be reduced. That is, when the kickback is generated, the increase in the voltage Vm of the power line 21 can be constrained to prevent the P-channel MOSFET 11, 12 from being broken, and a low cost motor drive circuit can be realized.

THIRD EMBODIMENT

Figure 3:
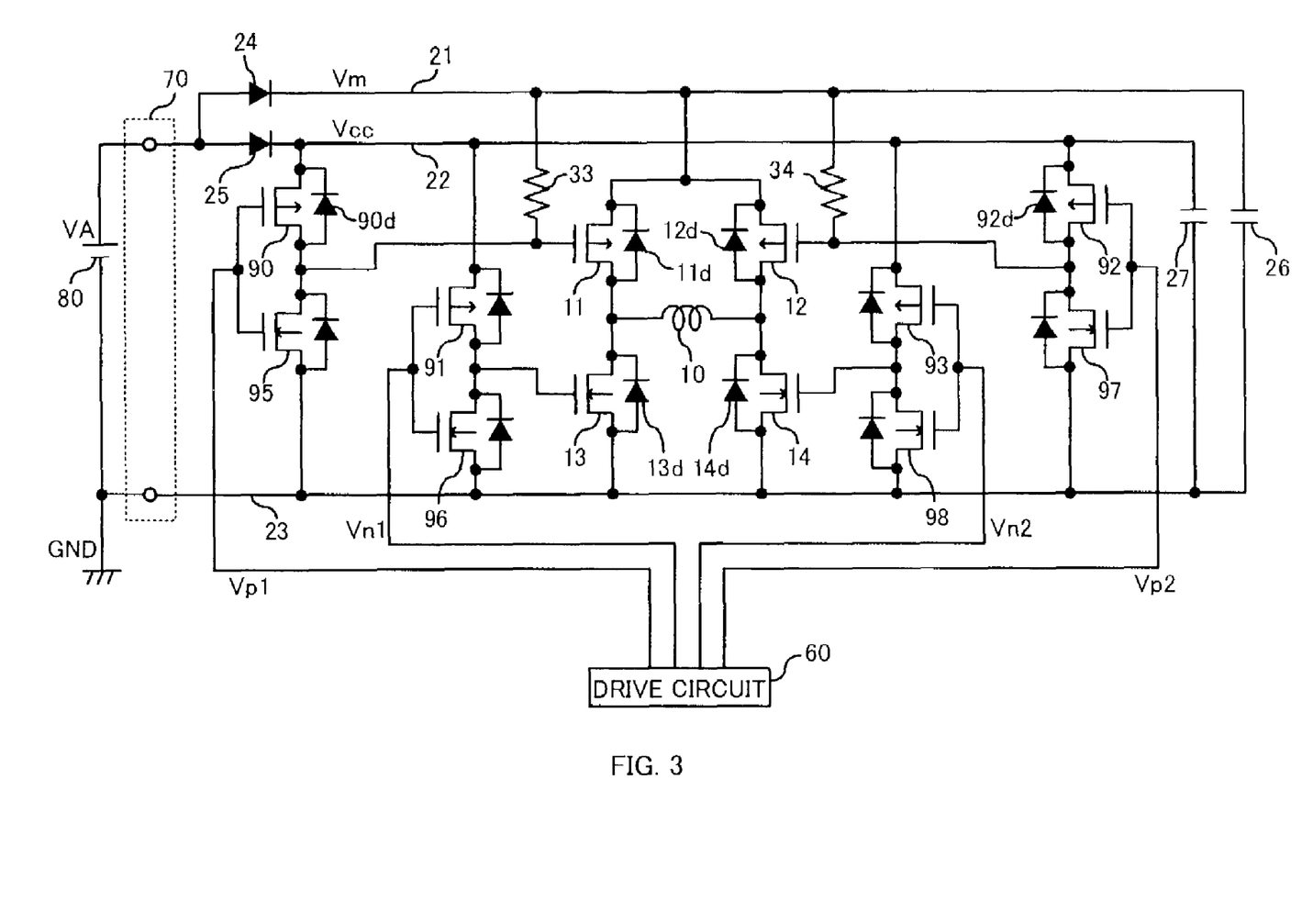
FIG. 3 is a diagram of a configuration example of a motor drive circuit that is a third embodiment of the present invention.

A configuration of a motor drive circuit of a third embodiment will be described. FIG. 3 is a diagram of a configuration example of a motor drive circuit that is the third embodiment of the present invention. The motor drive circuit shown in FIG. 3 includes P-channel MOSFET 90 to 93 and N-channel MOSFET 95 to 98 instead of the power sources 31, 32, the NPN-transistors 41 to 48, and the PNP-transistors 51, 52 shown in FIG. 1. Unlike the first embodiment, the resistor 33 is connected to the power line 21 at one end and connected to the gate of the P-channel MOSFET 11 at the other end. The resistor 34 is connected to the power line 21 at one end and connected to the gate of the P-channel MOSFET 12 at the other end.

The P-channel MOSFET 90 (first control MOSFET), the N-channel MOSFET 95, and the resistor 33 configure a control circuit (first control circuit) that controls ON/OFF of the P-channel MOSFET 11. If the voltage Vp1 is H-level, the P-channel MOSFET 90 is turned off; the N-channel MOSFET 95 is turned on; the gate voltage of the P-channel MOSFET 11 is reduced to the voltage of the ground line 23; and the P-channel MOSFET 11 is turned on. On the other hand, if the voltage Vp1 is L-level, the P-channel MOSFET 90 is turned on; the N-channel MOSFET 95 is turned off; the gate voltage of the P-channel MOSFET 11 is raised to the voltage Vcc of the power line 22; and the P-channel MOSFET 11 is turned off.

Similarly, the P-channel MOSFET 92 (second control MOSFET), the N-channel MOSFET 97, and the resistor 34 configure a control circuit (second control circuit) that controls ON/OFF of the P-channel MOSFET 12. If the voltage Vp2 is H-level, the P-channel MOSFET 92 is turned off; the N-channel MOSFET 97 is turned on; the gate voltage of the P-channel MOSFET 12 is reduced to the voltage of the ground line 23; and the P-channel MOSFET 12 is turned on. On the other hand, if the voltage Vp2 is L-level, the P-channel MOSFET 92 is turned on; the N-channel MOSFET 97 is turned off; the gate voltage of the P-channel MOSFET 12 is raised to the voltage Vcc of the power line 22; and the P-channel MOSFET 12 is turned off.

The P-channel MOSFET 91 and the N-channel MOSFET 96 configure a control circuit (third control circuit) that controls ON/OFF of the N-channel MOSFET 13. If the voltage Vn1 is L-level, the P-channel MOSFET 91 is turned on; the N-channel MOSFET 96 is turned off; the gate voltage of the N-channel MOSFET 13 is raised to the voltage Vcc of the power line 22; and the N-channel MOSFET 13 is turned on. On the other hand, if the voltage Vn1 is H-level, the P-channel MOSFET 91 is turned off; the N-channel MOSFET 96 is turned on; the gate voltage of the N-channel MOSFET 13 is reduced to the voltage of the ground line 23; and the N-channel MOSFET 13 is turned off.

Similarly, the P-channel MOSFET 93 and the N-channel MOSFET 98 configure a control circuit (fourth control circuit) that controls ON/OFF of the N-channel MOSFET 14. If the voltage Vn2 is L-level, the P-channel MOSFET 93 is turned on; the N-channel MOSFET 98 is turned off; the gate voltage of the N-channel MOSFET 14 is raised to the voltage Vcc of the power line 22; and the N-channel MOSFET 14 is turned on. On the other hand, if the voltage Vn2 is H-level, the P-channel MOSFET 93 is turned off; the N-channel MOSFET 98 is turned on; the gate voltage of the N-channel MOSFET 14 is reduced to the voltage of the ground line 23; and the N-channel MOSFET 14 is turned off.

In the motor drive circuit with this configuration, when the voltage Vm of the power line 21 is increased due to the generation of the kickback, the source voltage and gate voltage of the P-channel MOSFET 11, 12 are increased. However, since the gate of the P-channel MOSFET 11 is connected to the drain of the P-channel MOSFET 90, the gate voltage of the P-channel MOSFET 11 is constrained to a voltage Vcc+Vf, which is obtained by adding a forward voltage Vf of the parasitic diode 90d (first diode) of the P-channel MOSFET 90 to the voltage Vcc of the power line 22. Similarly, since the gate of the P-channel MOSFET 12 is connected to the drain of the P-channel MOSFET 92, the gate voltage of the P-channel MOSFET 12 is constrained to a voltage Vcc+Vf, which is obtained by adding a forward voltage Vf of the parasitic diode 92d (second diode) of the P-channel MOSFET 92 to the voltage Vcc of the power line 22.

If the voltage Vm of the power line 21 is continuously increased, the voltage between the gate and source of the P-channel MOSFET 11, 12 exceeds a threshold voltage and the P-channel MOSFET 11, 12 are turned on. Therefore, when the kickback is generated, if the voltage Vm of the power line 21 is increased, the P-channel MOSFET 11, 12 are turned on, and the current generated by the kickback goes around the loop on the power source side of the H-bridge circuit as is the case with the first embodiment.

As a result, the increase in the voltage Vm of the power line 21 due to the generation of the kickback is constrained to the same level as the threshold voltage of the P-channel MOSFET 11, 12. Therefore, a large size Zener diode is not necessary for constraining the increase in the voltage Vm of the power line 21. Since the current generated by the kickback goes around the loop on the power source side of the H-bridge circuit, the size of the condenser 26 can be reduced. That is, when the kickback is generated, the increase in the voltage Vm of the power line 21 can be constrained to prevent the P-channel MOSFET 11, 12 from being broken, and a low cost motor drive circuit can be realized.

Since the parasitic diodes 90d, 92d of the P-channel MOSFET 90, 92 controlling ON/OFF of the P-channel MOSFET 11, 12 are used to constrain the increase in the gate voltage of the P-channel MOSFET 11, 12, the dedicated diodes 85, 86 shown in the second embodiment is not necessary for constraining the gate voltage of the P-channel MOSFET 11, 12, and the number of parts can be reduced.

The first to third embodiments of the present invention have been described. Since the gate voltage of the P-channel MOSFET 11, 12 is constrained to a voltage corresponding to the voltage Vcc of the power line 22 as described above if the voltage Vm of the power line 21 is increased when the kickback is generated, the P-channel MOSFET 11, 12 are automatically turned on, and the current generated by the kickback goes around the loop on the power source side of the H-bridge circuit. As a result, the increase in the voltage Vm of the power line 21 is constrained to the same level as the threshold voltage of the P-channel MOSFET 11, 12. Therefore, a large size Zener diode is not necessary for constraining the increase in the voltage Vm of the power line 21, and the size of the condenser 26 can be reduced to about 1 μF to 10 μF, for example. That is, when the kickback is generated, the increase in the voltage Vm of the power line 21 can be constrained to prevent the P-channel MOSFET 11, 12 from being broken, and a low cost motor drive circuit can be realized.

By connecting one ends of the resistors 33, 34 to the power line 22 as shown in the first embodiment, the increase in the gate voltage of the P-channel MOSFET 11, 12 can be constrained to the voltage Vcc of the power line 22. Since the resistors 33, 34 are circuits that are also used when controlling ON/OFF of the P-channel MOSFET 11, 12, a motor drive circuit can be realized that can constrain the increase in the voltage Vm of the power line 21 to prevent the P-channel MOSFET 11, 12 from being broken when the kickback is generated, without increasing the number of parts.

As shown in the second embodiment, the diodes 85, 86 can be used to constrain the increase in the gate voltage of the P-channel MOSFET 11, 12 to a voltage corresponding to the voltage Vcc of the power line 22.

As shown in the third embodiment, the parasitic diodes 90d, 92d of the P-channel MOSFET 90, 92 can substitute for the diodes 85, 86 of the second embodiment. That is, since the P-channel MOSFET 90, 92 are circuits that are also used when controlling ON/OFF of the P-channel MOSFET 11, 12, a motor drive circuit can be realized that can constrain the increase in the voltage Vm of the power line 21 to prevent the P-channel MOSFET 11, 12 from being broken when the kickback is generated, without increasing the number of parts.

If the diode 24 is disposed for preventing a current from flowing back from the power line 21 to the power source 80 when the power source 80 is reversely connected to the connector 70, the voltage Vm is markedly increased when the kickback is generated. Therefore, the configurations shown in the embodiments are particularly effective for constraining the increase in the voltage Vm of the power line 21.

The above embodiments are for the purpose of facilitating the understanding of the present invention and do not limit the interpretation of the present invention. The present invention may be changed/altered without departing from the spirit thereof and the present invention includes the equivalents thereof.

For example, although the H-bridge circuit is used for controlling the motor coil of the single-phase fan motor in the embodiments, an applicable motor is not limited to a fan motor and not limited to a single phase.

Although the source transistor in the H-bridge circuit is the P-channel MOSFET in the embodiments, the source transistor can be a PNP-transistor. That is, the source transistor in the H-bridge circuit may be any transistors that are turned on/off in accordance with a voltage difference between an electrode on the power line 21 and a control electrode. If the source transistor is a PNP-transistor, the regenerative diodes (first and second regenerative diodes) may be disposed in parallel with the PNP-transistor.

Although the sink transistor in the H-bridge circuit is the N-channel MOSFET in the embodiments, this is not a limitation, and the sink transistor may be a P-channel MOSFET or bipolar transistor. For example, the sink transistor can be an NPN-transistor. If the sink transistor is a bipolar transistor, the regenerative diodes (third and fourth regenerative diodes) may be disposed in parallel with the bipolar transistor.

Although the power line 21 (first power line) and the second power line 22 (second power line) are branched from the same power source 80 in the embodiments, this is not a limitation, and the power line 21 and the power line 22 may be connected to different power sources. If the power line 21 and the power line 22 are connected to different power sources, the voltage of the power line 22 may be a voltage that turns off the P-channel MOSFET 12 (second source transistor) when a current flows from the P-channel MOSFET 11 (first source transistor) to the N-channel MOSFET 14 (second sink transistor), for example, as shown in FIG. 2. For example, the power line 21 can be connected to one of two power sources generating a voltage VA, and the power line 22 can be connected to the other.

It is claimed:

1. A motor drive circuit comprising:
    a first power line;
    a second power line;
    an H-bridge circuit that includes a first source transistor and a first sink transistor connected serially, a second source transistor and a second sink transistor connected serially, a motor coil connected at a connection point between the first source transistor and the first sink transistor, and first to fourth regenerative diodes disposed respectively on the first and second source transistors and the first and second sink transistors, the H-bridge circuit being connected between the first power line and the ground, the first source transistor and the second sink transistor being switched complementarily to the second source transistor and the first sink transistor; and
    a voltage constraint circuit connected between the second power line and control electrodes of the first and second source transistors, the voltage constraint circuit constraining increase in the voltage of the control electrodes of the first and second source transistors to a voltage corresponding to the voltage of the second power line,
    the first and second source transistors being transistors turned on/off in accordance with a voltage difference between an electrode on the first power line and the control electrode,
    the voltage of the second power line being a voltage that turns off the second source transistor if a current flows from the first source transistor to the second sink transistor.

2. The motor drive circuit of claim 1,
    wherein the voltage constraint circuit is configured by
    a first resistor connected to the second power line at one end and connected to the control electrode of the first source transistor at the other end, and
    a second resistor connected to the second power line at one end and connected to the control electrode of the second source transistor at the other end.

3. The motor drive circuit of claim 1, comprising:
    a first resistor connected to the first power line at one end and connected to the control electrode of the first source transistor at the other end; and
    a second resistor connected to the first power line at one end and connected to the control electrode of the second source transistor at the other end,
    wherein the voltage constraint circuit is configured by
    a first diode connected to the second power line on the cathode side and connected to the control electrode of the first source transistor on the anode side, and
    a second diode connected to the second power line on the cathode side and connected to the control electrode of the second source transistor on the anode side.

4. The motor drive circuit of claim 3, comprising:
    a first control MOSFET connected to the second power line at an input electrode and connected to the control electrode of the first source transistor at an output electrode, when turned on, the first control MOSFET applying the voltage of the second power line to the control electrode of the first source transistor to turn off the first source transistor; and
    a second control MOSFET connected to the second power line at an input electrode and connected to the control electrode of the second source transistor at an output electrode, when turned on, the second control MOSFET applying the voltage of the second power line to the control electrode of the second source transistor to turn off the second source transistor, wherein the first diode is a parasitic diode of the first control MOSFET, and
wherein the second diode is a parasitic diode of the second control MOSFET.

5. The motor drive circuit of claim 1,
wherein the first power line is disposed with a diode that prevents a current from flowing back to the power source.

6. The motor drive circuit of claim 2,
wherein the first power line is disposed with a diode that prevents a current from flowing back to the power source.

7. The motor drive circuit of claim 3,
wherein the first power line is disposed with a diode that prevents a current from flowing back to the power source.

8. The motor drive circuit of claim 4,
wherein the first power line is disposed with a diode that prevents a current from flowing back to the power source.

* * * * *